Aug. 25, 1964     I. M. LEVY ETAL     3,146,387
ELECTRIC MOTOR STARTING CIRCUITS
Original Filed April 27, 1956
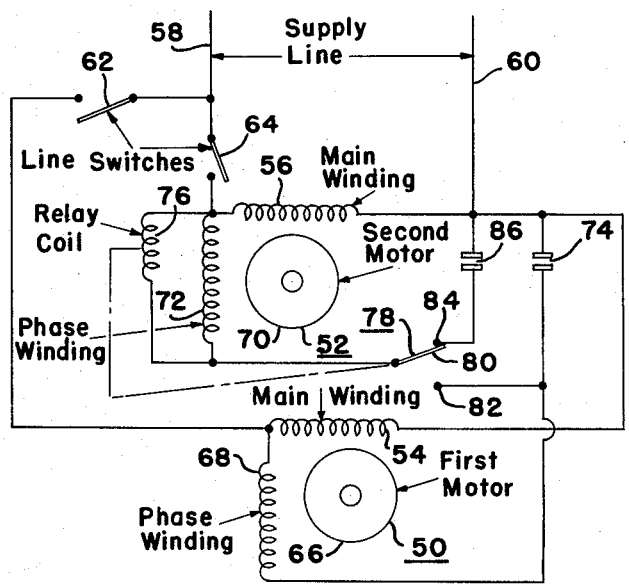
INVENTORS
Irving M. Levy
BY Robert W. Leland
Their Attorney 3,146,387
ELECTRIC MOTOR STARTING CIRCUITS
Irving M. Levy and Robert W. Leland, Dayton, Ohio, assignors to General Motors Corporation, Detroit, Mich., a corporation of Delaware
Application Apr. 22, 1959, Ser. No. 808,353, now Patent No. 3,045,159, dated July 17, 1962, which is a division of application Ser. No. 606,279, Aug. 27, 1956. Divided and this application Jan. 17, 1962, Ser. No. 166,961
1 Claim. (Cl. 318—112)

This invention relates to starting circuits for electric motor systems and particularly to systems for starting and running several capacitor motors with a reduced number of capacitors.

This is a divisional application of copending application Serial No. 808,353, filed April 22, 1959, now Patent 3,045,159, Levy et al., issued July 17, 1962, which was a division of parent disclosure of now abandoned application Serial No. 606,279, filed August 27, 1956.

On some motor applications several motors are required. Generally, each of the motors is started separately and operated independently of other motors on the system. When capacitor motors are used, each employing its own capacitors, the number of capacitors required are appreciable in size and cost. A saving in the number of such capacitors used is desirable on mass-produced units such as for circuits embodying both a fan and compressor motor on refrigerators and air conditioners.

An object of this invention is to provide a circuit wherein two or more motors are so interconnected that a portion of the capacitors used is common to all motors during a part of the operating cycle of this usually independently operable motors.

Another object of this invention is to provide a circuit wherein independently operable capacitor motors utilize combined running capacitance after running speed is attained by progressively started motors in the system.

Another object is to provide for starting of several capacitor motors with a minimum number of capacitors while providing improved power factor by balancing lagging currents due to inductive reactances of the motors with leading current of capacitive reactances used in starting and/or running of the motors.

Another object is to provide a circuit for operating a motor as a capacitor-run motor when operating by itself but switching the running capacitor over to include in the circuit a second motor thereby paralleling phase windings of each motor relative to the other using a capacitance in series with the paralleled phase windings for a saving in the capacitor size and cost necessary if each motor were operated independently.

Further objects and advantages of the present invention will be apparent from the following description, reference being had to the accompanying drawings wherein preferred embodiments of the present invention are clearly shown.

In the drawing, the figure illustrates an embodiment of a circuit having features in accordance with the present invention.

The aforementioned and other objects are accomplished by the present invention in a dual motor starting circuit using a reduced number of capacitors for starting of several capacitor motors. Although the invention as disclosed in the present embodiments is not limited to refrigerating apparatus or air conditioners, the circuitry is particularly adapted to such use. It is to be understood that the first motor could then have one horsepower rating such as a fan motor while the second motor could have a different horsepower rating such as a compressor motor. However, the invention could also be used where both the first and second motors have the same horsepower rating.

The figure is a diagram of circuitry representing an embodiment of this invention. In this case the starting capacitance of the second motor is in series with the phase or auxiliary winding of this motor only. A first motor represented by the numberal 50 and a second motor represented by the numeral 52 have main windings 54 and 56, respectively. The main winding 54 for the first motor 50 is connectible across the power supply line leads 58 and 60 by means of a first line switch 62. The main winding 56 of the second motor is connectible across the power line leads 58–60 by means of a secondary line switch 64. The first motor 50 has a rotor 66 and a phase or auxiliary winding 68. The second motor 52 has a rotor 70 and a phase or auxiliary winding 72. Closing the first power switch 62 connects the main winding 54 of motor 50 across the line in parallel with the phase winding 68 which is series-connected to a capacitor 74 for the first motor 50. The phase winding 72 of the second motor 52 may have a potential relay coil 76 connected in parallel therewith responding to voltage drop or potential across winding 72. If a potential relay is used, the relay coil 76 controls a relay contact switch 78 to connect a switch arm varying a movable contact 80 between fixed contacts 82 and 84. The switch contact is normally closed with contacts 80 and 84 closing a circuit with a capacitance 86 in series with the auxiliary winding 72. It is understood that means other than the potential relay may be used to actuate switch arm 78. The capacitor 86 serves as the starting capacitor connected in series with the phase winding 72 for motor 52. Closing of switch 64 connects the second motor across the supply line. If a potential relay is employed, there with be an increase in voltage across the potential relay coil 76 as motor 62 approaches operating speed. Then the relay switch 78 is energized sufficiently to close contacts 80–82 by the increased voltage on relay coil 76 leaving its normally closed position connecting contacts 80 and 84 with capacitor 86 as a starting capacitor shown in the figure and utilizing capacitor 74 as a running capacitor.

It will be noted that capacitor 74 is permanently connected in series with the phase winding of the first motor when the second motor is not connected to the power supply line. When the second motor has been started and switch 78 is operated to close contacts 80 and 82, capacitor 74 is then connected in series with the parallel circuit of the phase windings of both motors and serves as a running capacitor for each motor.

It is understood the relay means provided in the circuit illustrated may be replaced by other switching means without departing from the essence of the present invention. Also, although only two motors are shown, it is to be understood that several motors could be used.

The advantage of having capacitor-start capacitor-run motors is realized in the starting circuitry shown in the accompanying disclosure. Thus an improved power factor due to capacitive reactances in circuitry with the inductive reactances of the motors, is obtained in accordance with the present invention.

While the embodiment of the present invention as herein disclosed constitutes a preferred form, it is to be understood that other forms might be adopted.

What is claimed is as follows:

In circuitry for starting and running several capacitor motors with a reduced number of capacitors all energizable from a power supply source and including both first and second capacitor motors operable therefrom as to main and phase windings of each thereof, the improvement which comprises only first and second capacitive impedance connected at one side thereof in common to the source, said first capacitive impedance for starting phase shift having a connection in series with the first motor phase winding, and a switching means including a relay portion having an actuating winding sensitive to operation and energization of only the windings of the second capacitor motor whereby said second capacitive impedance is connected during starting operation only for the second capacitor motor, said switching means after starting of the second capacitor motor being shifted due to relay operation to have the phase winding of the second motor in the circuit with only said first capacitive impedance shared by both the phase windings of the first and second capacitor motors during running operation thereof.

References Cited in the file of this patent

UNITED STATES PATENTS

| | | |
|---|---|---|
| 2,782,351 | Suhr | Feb. 19, 1957 |
| 2,784,362 | Chang | Mar. 5, 1957 |

FOREIGN PATENTS

| | | |
|---|---|---|
| 774,369 | Great Britain | May 8, 1957 |